May 23, 1944.  B. H. MORTUS  2,349,513
METHOD OF MAKING LOCK NUTS
Filed Jan. 9, 1943   2 Sheets-Sheet 1

Undersize Tap
for Tapping Slotted
End Only

INVENTOR.
BENJAMIN H. MORTUS
BY
Kwis Hudson & Kent
ATTORNEYS

May 23, 1944.  B. H. MORTUS  2,349,513
METHOD OF MAKING LOCK NUTS
Filed Jan. 9, 1943    2 Sheets-Sheet 2

INVENTOR.
BENJAMIN H. MORTUS
BY
Kwis Hudson & Kent
ATTORNEYS

Patented May 23, 1944

2,349,513

UNITED STATES PATENT OFFICE 2,349,513

METHOD OF MAKING LOCK NUTS

Benjamin H. Mortus, Shaker Heights, Ohio, assignor to The National Screw & Manufacturing Company, Cleveland, Ohio, a corporation of Ohio Application January 9, 1943, Serial No. 471,832

1 Claim. (Cl. 10—86)

This invention relates to a method of forming lock nuts and has for its object to produce a lock nut which has a closer grip on the screw or bolt to which it is applied and which does less damage to the screw or bolt than the lock nuts now employed.

Still further the invention aims to provide a lock nut which can be used over and over again without impairing the locking action thereof.

More specifically the invention relates to a method of forming lock nuts of the castle type the slotted sections of which are bent inwardly to close the slots, the novelty residing in the use of an undersize tap for retapping the closed portion only of the nut.

The invention may be further briefly summarized as consisting in the steps of the improved method which will be described in the specification and set forth in the appended claim.

In the accompanying sheets of drawings which show the steps in the formation of my improved lock nut, Fig. 1 is a side view of a slug cut from a round rod;

Figure 11:
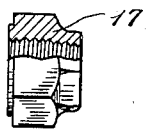
Fig. 11 is a side view of the nut with the slotted portion pressed closed.
Figure 12:
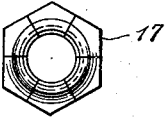
Fig. 12 is an end view of the same.
Figure 13:
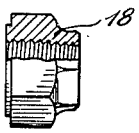
Fig. 13 is a side view showing the closed end retapped by the use of an undersize tap in which operation the closed portion only is tapped.
Figure 14:
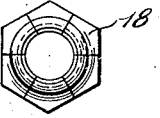
Fig. 14 is an end view of the same.
Figure 15:
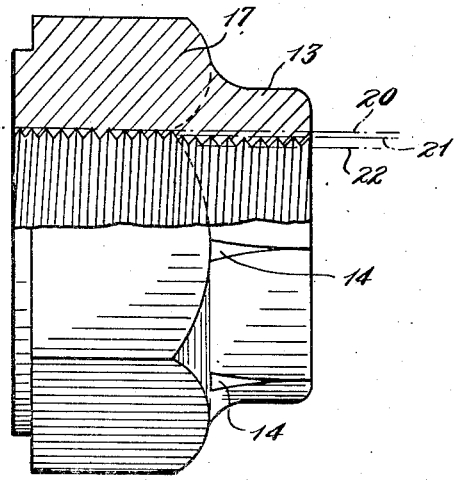
Figure 16:
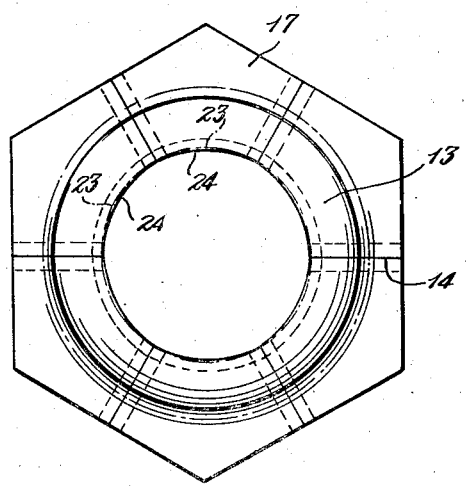
Figure 17:
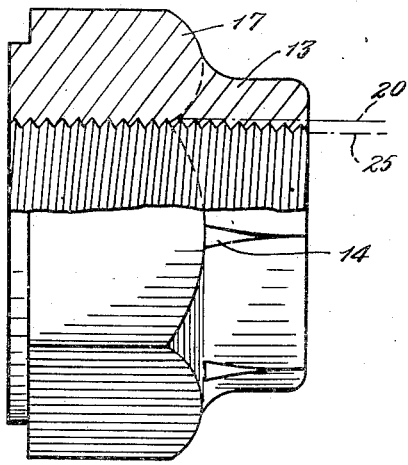
Figure 18:
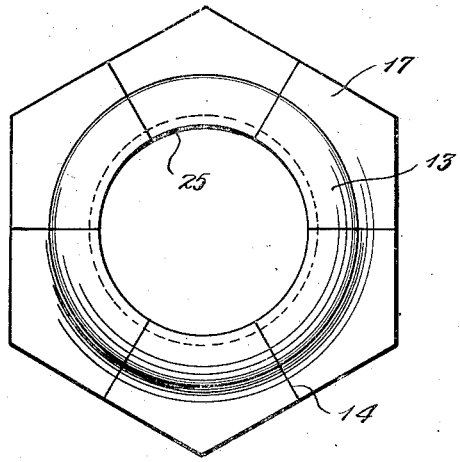

Figs. 15 and 16 are views on an enlarged scale corresponding to Figs. 11 and 12; and Figs. 17 and 18 are views on an enlarged scale corresponding to Figs. 13 and 14.

Figure 1:
Figure 2:
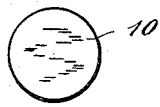
Fig. 2 is an end view of the same.
Figure 3:
Fig. 3 is a side view of the slug cold-formed to hexagonal shape.
Figure 4:
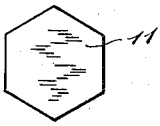
Fig. 4 is an end view of the same.

Referring now to the drawings, in the first step of the process or method a slug 10, shown in Figs. 1 and 2, is cut from a wire or rod and in the next step it is squeezed to polygonal shape, in this instance to hexagonal shape, to form a hexagonal blank 11 as shown in Figs. 3 and 4. These two operations can be combined into one if there is initially employed a polygonal wire or rod.

Figure 5:
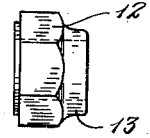
Fig. 5 is a side view of the nut after it has been drilled and formed externally in the usual manner.
Figure 6:
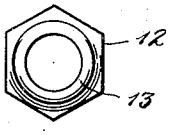
Fig. 6 is an end view of the same.

Next the blank is drilled and is shaped externally to form the nut blank 12 shown in Figs. 5 and 6. In this operation one end of the blank is reduced in thickness externally, as shown at 13.

Figure 7:
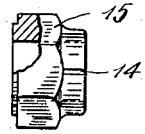
Fig. 7 is a side view of the nut after it has been saw-slotted at the reduced end.
Figure 8:
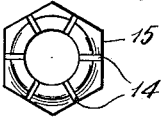
Fig. 8 is an end view of the same.
Figure 9:
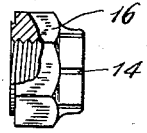
Fig. 9 is a side view of the nut after it has been tapped.
Figure 10:
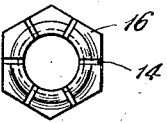
Fig. 10 is an end view of the same.

In the next operation the reduced end 13 is sawed as at 14 producing the sawed blank 15, as shown in Figs. 7 and 8. For a ½ inch nut the sawed slot is approximately $\frac{1}{32}$ inch in width. Next the sawed blank is tapped, producing the blank 16, as shown in Figs. 9 and 10.

In the succeeding operation the sections of the slotted end of the blank are forced inwardly until the sides of the slots engage each other for a substantial part of their length, as shown at 17 in Figs. 11 and 12.

Up to this point the operations are well known and the lock nuts produced thereby are commercial lock nuts well known in the art, with this exception that the slotted portions of the reduced end were not pressed inwardly so as to engage each other particularly for a substantial part of their length. However, these lock nuts are not entirely satisfactory because when the sections of the reduced ends of the nut are forced inwardly, the bore of the reduced end is pressed out of round, and in the case of a nut having six sections the bore is somewhat hexagonal in shape. The disadvantage of the use of a lock nut of this kind is that it causes damage to the screw or bolt to which it is applied because of its out of round shape.

I have improved the lock nuts of this type by retapping the nuts at the reduced end only, using a slightly undersize tap, thus producing the lock nut 18 shown in Figs. 13 and 14, the bore of this lock nut, as viewed from the end (Fig. 14) being perfectly round in cross-section, whereas the bore of the lock nut shown in Fig. 12 is out of round.

The undersize tap which I employ is from .005 inch to .008 inch (more or less) smaller in diameter than the tap utilized to tap the nut shown in Figs. 11 and 12. This undersize tap is shown by dotted lines at 19 in Fig. 13, and it is run into the nut from the larger end so as not to cross the threads of the finished lock nut. This produces a lock nut which does not damage the screw or bolt to which it is applied and which can be used over and over again, especially as sharp edges and burrs are eliminated both internally and externally by reason of the engagement of the slotted sections of the blank as described.

In Figs. 15 to 18 I have shown on an enlarged scale the lock nuts of Figs. 11 to 14. The dotted line 20 in Fig. 15 represents the outside diameter of the thread of the nut. The dotted line 21 represents the outside diameter of the reduced part, and the dotted line 22 represents the inside diameter of the reduced part. The distance between the dotted line 23 and the full line 24 in Fig. 16 represents the amount of distortion of the sections at the slotted end of the nut prior to the second tapping operation.

In Fig. 17 the line 20 represents the outside diameter of the thread of the main part of the lock nut and the dotted line 25 represents the inside diameter of the reduced end after the second tapping operation. By reference to Fig. 18 it will be seen that this line is perfectly round due to the removal of the distorted portions of Figs. 15 and 16, i. e., the portions between the lines 23 and 24.

While I have shown and described the preferred method of making these lock nuts, I do not desire to be confined to the precise details shown but aim in my claim to cover all modifications which do not involve a departure from the spirit and the scope of the invention.

Having thus described my invention, I claim:

The process of making a lock nut which comprises drilling, facing and reducing the end of a blank externally at one end, slotting the reduced end of the blank, tapping the blank for its full length so as to produce a blank having a thread with a uniform pitch from one end of the blank to the other, forcing the slotted sections of the blank inwardly until they engage each other for a substantial part of their length, and retapping the blank at the reduced end with an undersize tap.

BENJAMIN H. MORTUS.